United States Patent [19]

Fischer et al.

[11] Patent Number: 5,167,310

[45] Date of Patent: Dec. 1, 1992

[54] HUB PART FOR A CLUTCH DISC

[75] Inventors: Matthias Fischer, Euerbach; Peter Wiggen, Grafenrheinfeld; Harald Jeppe, Schweinfurt, all of Fed. Rep. of Germany

[73] Assignee: Fichtel & Sachs AG, Schweinfurt, Fed. Rep. of Germany

[21] Appl. No.: 681,134

[22] Filed: Apr. 5, 1991

[51] Int. Cl.$^5$ ............................................. F16D 13/68
[52] U.S. Cl. ............................ 192/70.16; 192/106.2;
   192/113 R; 403/271; 403/365
[58] Field of Search ............... 192/70.16, 106.2, 70.17,
   192/70.2, 113 R, 70.12, 70.19; 74/446, 451;
   403/270, 271, 272, 247, 263, 253, 262, 365;
   474/902

[56] References Cited

U.S. PATENT DOCUMENTS

| | | | |
|---|---|---|---|
| 1,868,764 | 7/1932 | Reed | 192/70.16 X |
| 2,291,405 | 7/1942 | Nutt | 192/106.2 |
| 2,321,829 | 6/1943 | Leake | 403/365 X |
| 3,461,738 | 8/1969 | Pandjiris et al. | 74/446 |
| 4,416,564 | 11/1983 | Billet et al. | 192/106.2 X |
| 4,537,296 | 8/1985 | Lech et al. | 192/106.2 |

FOREIGN PATENT DOCUMENTS

| | | | |
|---|---|---|---|
| 691887 | 8/1964 | Canada | 192/106.2 |
| 2159264 | 6/1973 | Fed. Rep. of Germany . | |
| 3601903 | 8/1986 | Fed. Rep. of Germany . | |
| 967973 | 8/1964 | United Kingdom . | |
| 1055612 | 1/1967 | United Kingdom . | |

*Primary Examiner*—Rodney H. Bonck
*Attorney, Agent, or Firm*—Anderson Kill Olick & Oshinsky

[57] ABSTRACT

The invention relates to the production of a multi-part hub part for a clutch disc, wherein all parts are joined together by a weld. Different designs are possible, depending on the various welding processes. The apertures for damper springs can be produced very exactly in the hub disc owing to the production in individual parts. It is also possible to arrange lubricant reservoirs in a simple manner in the region of the points of separation of the individual components.

3 Claims, 4 Drawing Sheets

HUB PART FOR A CLUTCH DISC

BACKGROUND OF THE INVENTION

The invention relates to a hub part for a clutch disc of a motor vehicle friction clutch and to a method of producing it.

Hub parts produced from two parts are known in various forms. Thus, for example, it is known from DE-OS 2 159 264 to mutually press on a hub tube and a hub disc while taking measures to collect swarf formed during pressing. Torque transmission is effected via radially inwardly directed, sharp-edged teeth on the hub disc, which dig into the material of the hub. A two-part construction is also known from DE-OS 3 601 903 in which torque transmission is effected by axially directed teeth.

SUMMARY OF THE INVENTION

The present invention is directed to produce multi-part hub parts for clutch discs which can even withstand relatively high engine outputs despite having small dimensions.

By producing the hub part from at least two parts, of which one forms the hub disc and the other is designed as a piece of tube, and by welding the two parts in the region of the parting line formed by these parts, a homogeneous connection which is capable of withstanding high loads is produced between the two parts while retaining the advantages of easy punching of the apertures for the helical springs of a torsional vibration damper, in particular also those windows which have to be arranged close to the external diameter of the hub tube.

In the simplest form, the hub part consists of a plane hub disc and a piece of tube welded by its face end to the hub disc.

With a more symmetrical arrangement of the hub disc relative to the hub tube it is possible to manufacture the hub disc in one piece with an axially projecting portion of tube and to weld a separate piece of tube on the opposite side. However, it is also possible to produce the hub part in three parts by welding two pieces of tube on both sides of a plane hub disc.

The annular faces formed by the pieces of tube as well as the corresponding opposing faces of the hub disc are advantageously designed, when employing the electron or laser beam welding process, in the form of a truncated cone having a cone angle which is smaller than 180° and points away from the hub disc. With this design, accessibility to the weld seam for the weld tools is provided in an optimum manner.

When employing the condenser discharge welding process it is proposed that the annular face of the pieces of tube be provided in the region of their external diameter with an encircling, axially directed, protruding V-shaped rib of which the front edge is placed onto the substantially plane opposing face of the hub disc when loaded with axial force and is welded thereto so as to bring together the annular and opposing face. By employing the condenser discharge welding process and the design according to the invention of the components it is possible, on the one hand, to use the external diameter of the pieces of tube for guide purposes, for example for components of a friction device, despite the welding process without subsequent machining, as a sharp-edged transition between piece of tube and hub disc is guaranteed. On the other hand, the radially inwardly directed residual gaps remaining between end and opposing faces with this welding process can be used as a reservoir for a lubricant.

For multi-part hubs which are assembled by a different welding process, lubricant reservoirs can be formed in that the hub disc is designed, in the region of its internal diameter, a corresponding amount greater than the pieces of tube.

The various features of novelty which characterize the invention are pointed out with particularity in the claims annexed to and forming part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF PREFERRED EMBODIMENTS

Figure 1:
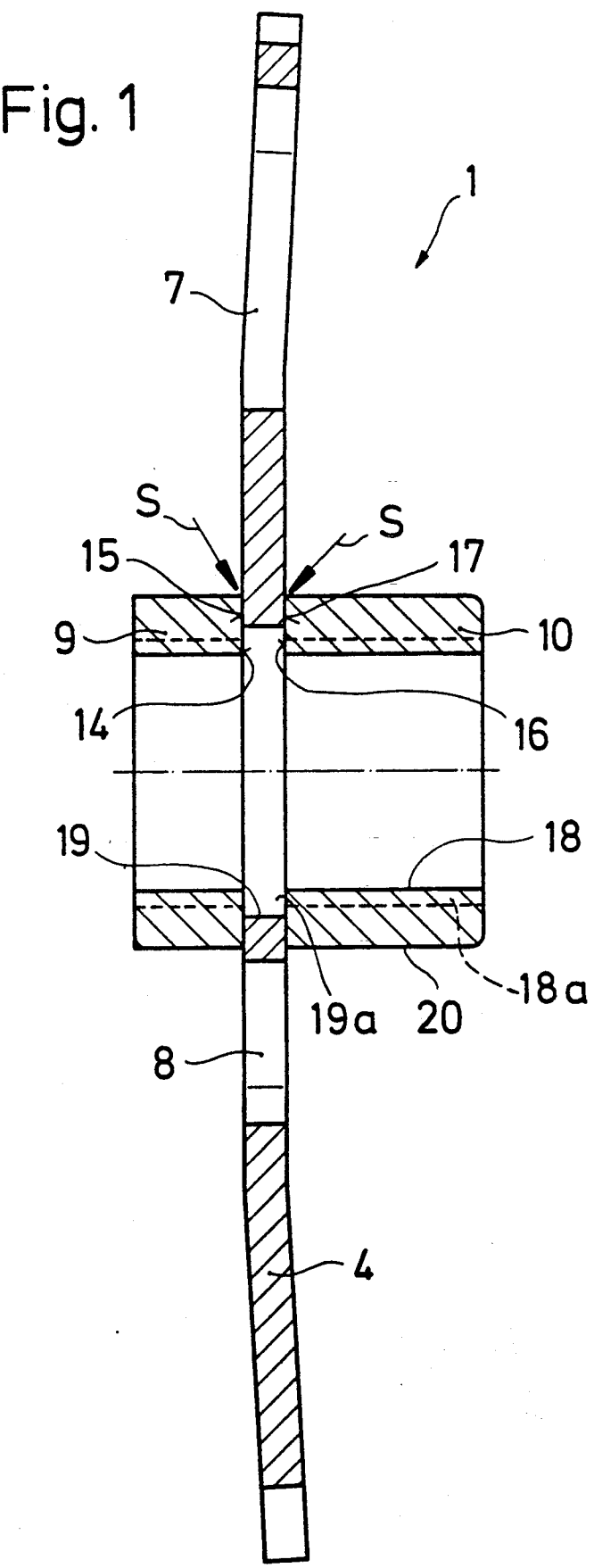
FIG. 1 a longitudinal section through a three-part hub part.
Figure 2:
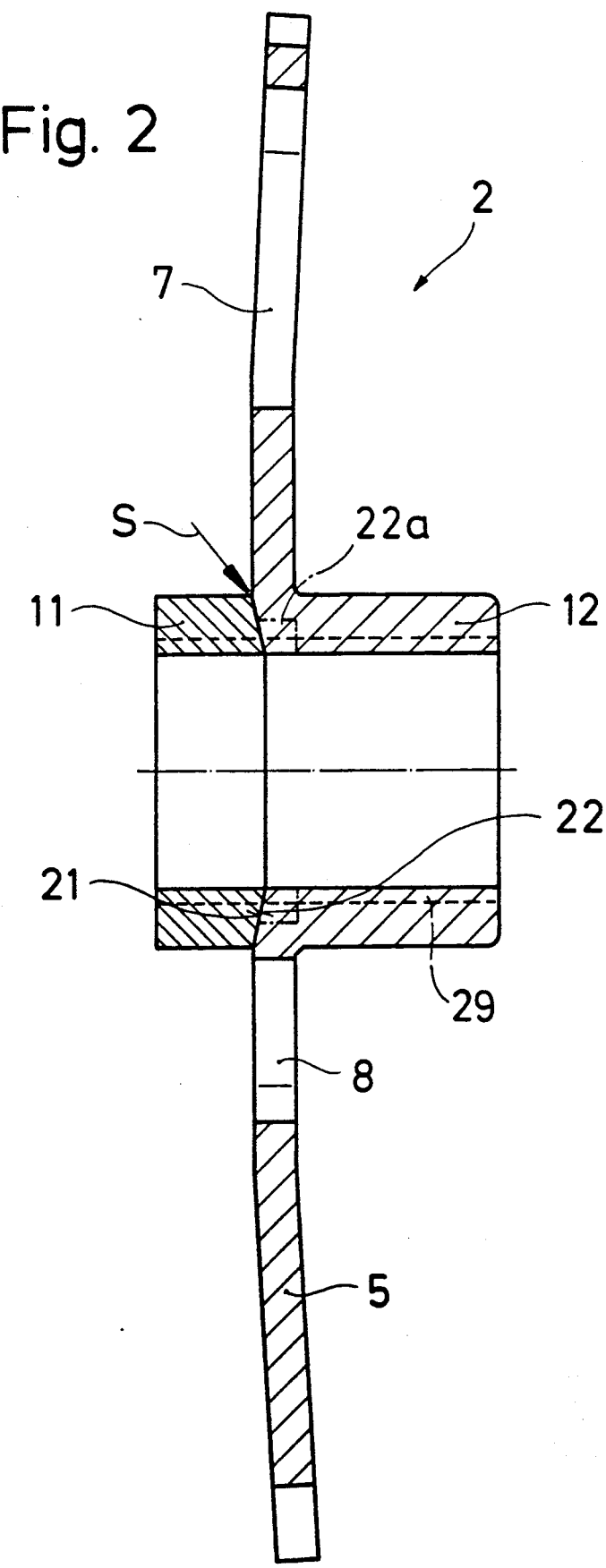
FIG. 2 shows a longitudinal section through a two-part hub part with a parting line designed in the form of a truncated cone.

FIG. 1 shows a longitudinal section of a welded three-part hub part 1. In the present case, a hub disc 4 is designed as a punched sheet metal part and is provided with apertures 7 and 8 for receiving helical springs of a torsional vibration damper. The hub disc 4 can be produced very simply as a punched part as it rests completely on the punching tool. The apertures 8 which are arranged only slightly radially outside the external diameter 20 of the two pieces of tube 9 and 10 can therefore also be produced with precision. The two pieces of tube 9 and 10 subsequently form the hub body and are each provided with an annular face 14 and 16 which are brought to rest on the hub disc 4 from both sides and there match corresponding opposing faces 15 and 17. In the present case, the internal diameter 19 of the hub disc 4 is enlarged in order subsequently to form a lubricant reservoir in the finished hub part. The three parts—4, 9 and 10—are held together in a device corresponding to the illustration in FIG. 1 and are then welded to one another The welding points are represented by an arrow S in each case and extend right round. The welding of the three parts results in a homogeneous connection and therefore a particularly high loading capacity of the hub part 1. Furthermore, it is possible to punch the large area hub disc 4 with high precision from a metal sheet, and this is highly important for the arrangement of the apertures 7 and 8. The two pieces of tube 9 and 10 can be separated from tube material virtually without loss of material to form blanks. After the welding process, a longitudinal profile 18a by means of which the hub part can be placed axially movably —but nonrotatably—onto a gear shaft (not shown) is introduced in the region of the internal diameter 18 of the pieces of tube 9 and 10. As slight axial movability of the hub relative to the gear shaft is advantageous during ventilation of a friction clutch, the space 19a formed by the larger internal diameter 19 of the hub disc 4 can be provided as a lubricant reservoir. The axial movability of the hub part on the gear shaft is therefore maintained over the entire service life FIG. 2 shows a structural shape which is modified in several ways with respect to FIG. 1. The hub part 2 shown here is designed in two parts. Portions of tube 11, 12 project axially from the hub disc 5 on both sides, the portion of tube 12 being manufactured in one part with the hub disc 5, for example by a forging process. The joint between the piece of tube 11 applied separately as a blank is located on the side of the hub disc 5 opposed to the portion of tube 12. Owing to this design, the apertures 7 and 8 for the helical springs in the hub disc 5 can also be produced with precision in that the hub disc 5 is placed, on the side remote from the portion of tube 12, onto a suitably adapted base and the apertures 7 and 8 are punched out. Owing to the precise application from the side which is on the left in the Figure, the apertures 8 extending close up to the portion of tube 12 can also be punched out exactly from the right-hand side. The annular face 21 on the piece of tube 11 and the corresponding opposing face 22 in the radially inner region of the hub disc 5 are inclined in the form of a truncated cone in the present case in order to reach the welding point S with a welding tool exactly in the direction of the parting line. When employing the electron or laser beam welding process, in particular, it is highly advantageous to be able to weld exactly in the parting line as, in this way, the weld can extend over the majority of the parting line from radially externally to the connection. If a lubricant reservoir is to be provided in the hub part 2, it is possible to provide a step 22a in the radially inner region of the opposing face 22 during the forging process, this step 22a having a suitably axial expanse and a suitable radial expanse. Internal teeth for rotational engagement with the gear input shaft, which are worked in after the welding process, are shown at 29.

Figure 3:
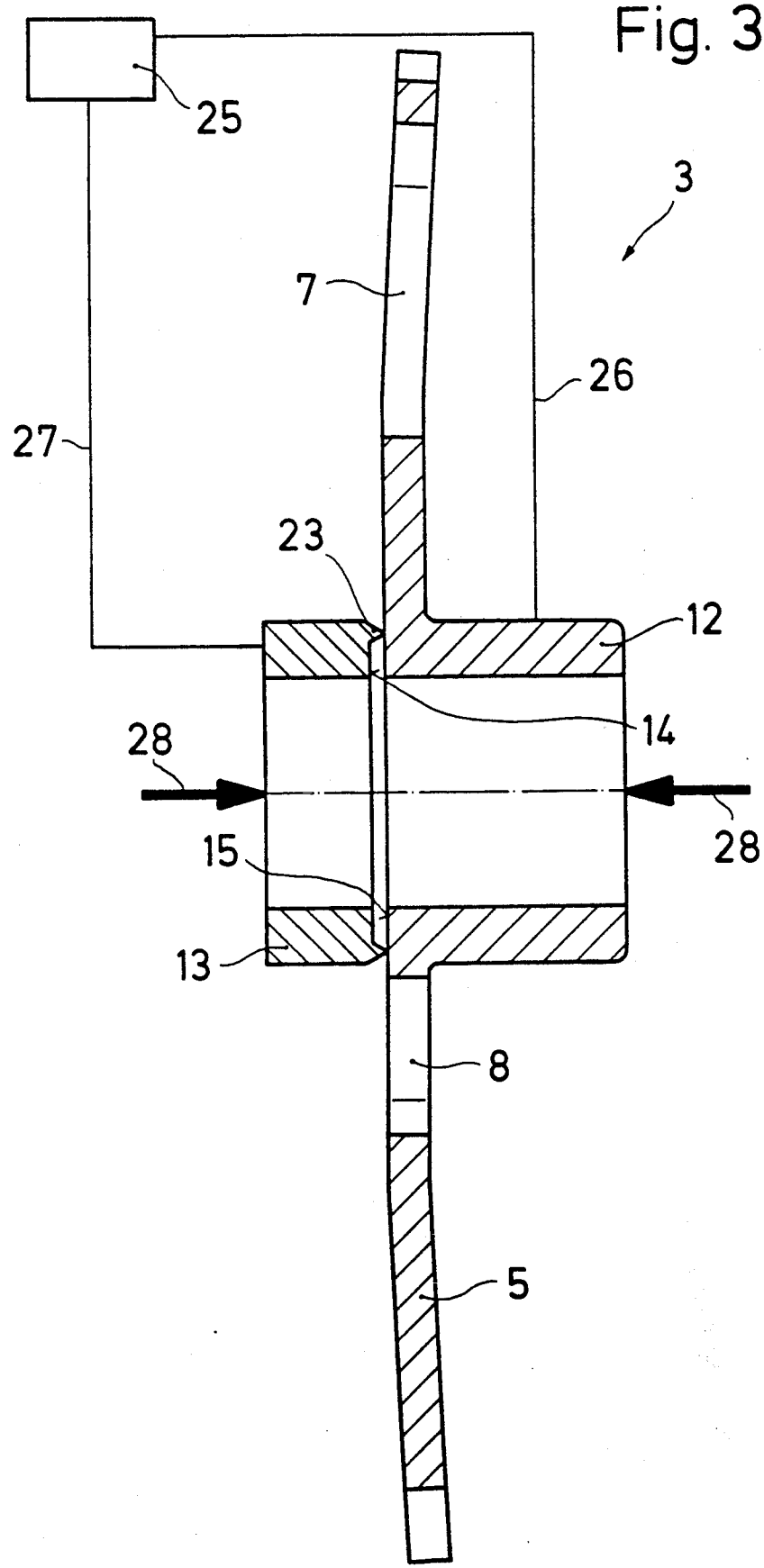
FIG. 3 shows a longitudinal section through a two-part hub part which is designed for employment of the condenser discharge welding process.
Figure 4:
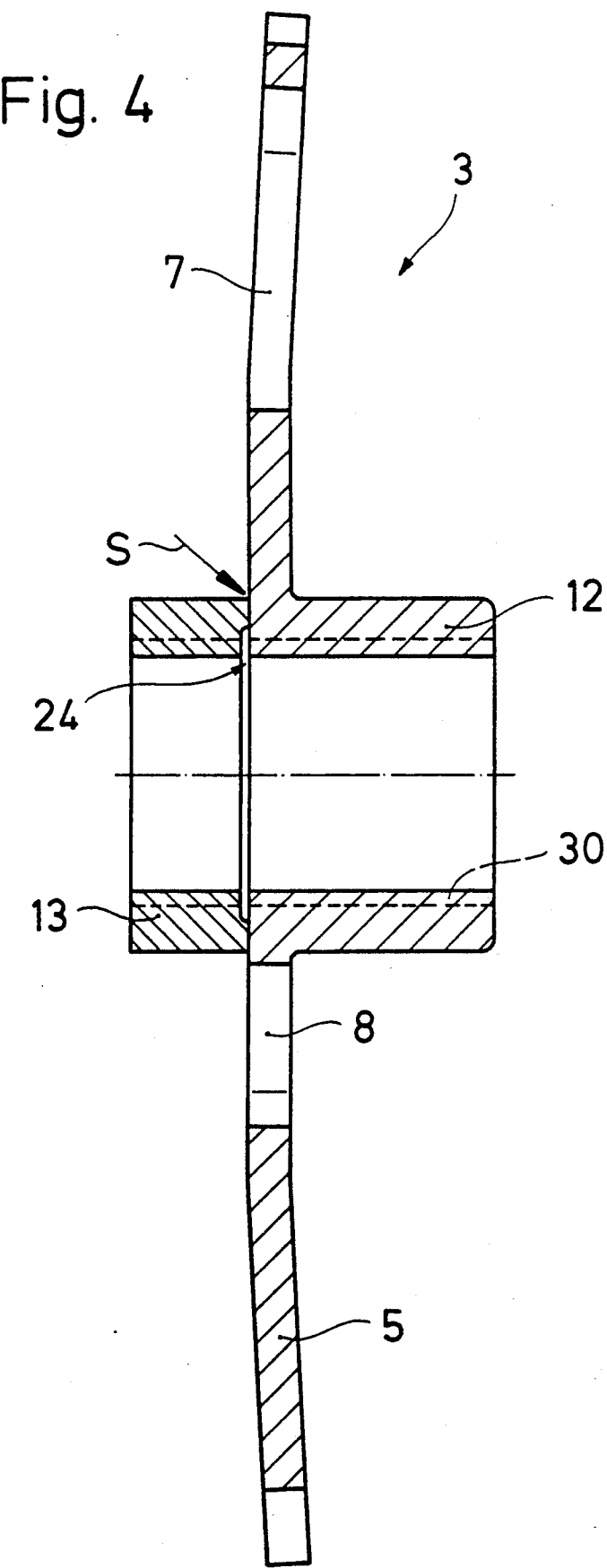
FIG. 4 shows the hub part according to FIG. 3 in a welded form.

FIGS. 3 and 4 show a hub part 3 which can be produced by a condenser discharge welding process. The hub part 3 is designed in two parts in the present case but it can also be designed directly in three parts. The hub disc 5 is prefabricated in one piece with the portion of tube 12 and has a plane opposing face 15 axially opposing the portion of tube 12. The apertures 7 and 8 are already provided for the helical springs. The piece of tube 13 which is to be welded on as a blank has an annular face 14 corresponding substantially to the opposing face 15. However, it is not plane in design over its entire radial expanse, but has, in the radially external region, a V-shaped rib 23 which extends toward the opposing face 15 of the portion of tube 12 and rests there with its apex In a device which is not shown in more detail, the two pieces of tube 12 and 13 are brought into alignment with one another and the piece of tube 13 is loaded by axial forces 28 in the direction of the hub disc 5 and the portion of tube 12. Both parts, the piece of tube 13 on the one hand and the hub disc 5 and the portion of tube 12 on the other hand, are connected by connecting cables 26 and 27 to a condenser discharge welding device 25. The components to be connected are briefly brought to the welding temperature by the welding process in the region of their mutual contact with the apex of the V-shaped rib 23 and the piece of tube 13 is moved toward the hub disc 5 by the axial force 28. The welding point is enlarged in both radial directions from its initially small contact face by this movement and is brought to a desired size. With a suitable design of the rib 23, a residual gap 24 which can serve as a lubricant reservoir can remain according to FIG. 4 which shows the finished hub part. Similarly, the space originally left clear by the V-shaped rib 23 can be filled in a defined manner at the radially externally located welding point according to arrow S so that a sharp 90° edge is formed at this point. This enables components, for example a friction arrangement, to be guided radially in this region without subsequent machining. The internal teeth worked in subsequently for the connection to the gear shaft are shown at 30.

It is pointed out that the hub parts according to FIGS. 1 and 2 can also be connected to one another by a friction welding process Furthermore, it is possible to introduce the lubricant reservoir both into the portion of tube 12 and additionally into the piece of tube 11 in a construction according to FIG. 2, so a particularly large volume can be achieved A double volume of lubricant is also possible in the construction according to FIGS. 3 and 4 in that the hub part described here is produced in three parts. The advantage of these lubricant reservoirs resides, in particular, in the fact that they are arranged substantially centrally over the axial expanse of the hub and can therefore supply the hub uniformly with lubricant over its entire length. Moreover, the lubricant supply is relatively well protected from contamination after introduction of the lubricant until final assembly.

While specific embodiments of the invention have been shown and described in detail to illustrate the application of the inventive principles, it will be understood that the invention may be embodied otherwise without departing from such principles.

What I claim is:

1. Hub part for a clutch disc of a motor vehicle friction clutch comprising an axially extending hub tube provided with internal teeth (18a, 29 30) and a hub disc (4; 5) which is rigidly connected to the hub tube and projects substantially radially therefrom, wherein the hub tube comprises at lest one portion of said hub tube (9, 10; 11, 12) projecting axially from the hub disc and the hub disc (4; 5) contains punched apertures (7, 8) for damper springs, and said at least one portion of said hub tube is a piece of tube (9, 10; 11; 13) formed separately from the hub disc (4; 5), and has a tooth-free axial end face (14, 16; 21; 23) abutting and welded to a tooth-free lateral face (15, 17; 22) of the hub disc (4; 5), the hub tube comprises two portions of said tube each extending axially in an opposite direction from and co-axially with the hub disc (5) and a first said portion of tube (11; 13) comprises said piece of tube butt-welded to the hub disc (5) and a second said portion of tube (12) comprises a single-part prefabricated shaped part formed together with the hub disc (5), an axial face (21) of said piece of tube (11) and an annular region (22) of the lateral face of the hub disc (5) adjacent said end face (21) have the form of a truncated cone which widens away from the hub disc (5).

2. Hub part for a clutch disc of a motor vehicle friction clutch comprising an axially extending hub tube provided with internal teeth (18a, 29 30) and a hub disc (4; 5) which is rigidly connected to the hub tube and projects substantially radially therefrom, wherein the hub tube comprises at least one portion of said hub tube (9, 10; 11, 12) projecting axially from the hub disc and the hub disc (4; 5) contains punched apertures (7, 8) for damper springs, and said at least one portion of said hub tube is a piece of tube (9, 10; 11; 13) formed separately from the hub disc (4; 5), and has a tooth-free axial end face (14, 16; 21; 23) abutting and welded to a tooth-free lateral face (15, 17; 22) of the hub disc (4; 5), the hub tube comprises two portions of said tube each extending axially in an opposite direction from and co-axially with the hub disc (5) and a first said portion of tube (11; 13) comprises said piece of tube butt-welded to the hub disc (5), the hub tube comprises two of said pieces of tube (9, 10) each with an internal diameter and projecting axially in opposite directions from and co-axially with the hub disc (4) and the hub disc (4) has an internal diameter greater than that of the two pieces of tube (9, 10) forming a lubricant reservoir (19a).

3. Hub part for a clutch disc of a motor vehicle friction clutch comprising an axially extending hub tube provided with internal teeth (18a, 29, 30) and a hub disc (4; 5) which i rigidly connected to the hub tube and projects substantially radially therefrom, wherein the hub tube comprises at lest one portion of said hub tube (9, 10; 11, 12) projecting axially from the hub disc and the hub disc (4; 5) contains punched apertures (7, 8) for damper springs, and said at least one portion of said hub tube is a piece of tube (9, 10; 11; 13) formed separately from the hub disc (4; 5), and has a tooth-free axial end face (14, 16; 21; 23) abutting and welded to a tooth-free lateral face (15, 17; 22) of the hub disc (4; 5), said at least one portion of said hub tube comprises two said pieces of tube and at least one of said pieces of tube (13) is formed separately from said hub disc and has at the end face an axially protruding rib (23) at which said at least one of said pieces of tube (15) is welded to the hub disc providing a gap forming a lubricant reservoir (24) and said rib is dimensioned so that the gap forming the lubricant reservoir is recessed into said at least one of said pieces of tubes.

* * * * *

UNITED STATES PATENT AND TRADEMARK OFFICE
CERTIFICATE OF CORRECTION

PATENT NO. : 5,167,310
DATED : December 1, 1992
INVENTOR(S) : Matthias Fischer

It is certified that error appears in the above-indentified patent and that said Letters Patent is hereby corrected as shown below:

On the title page, Insert Item [30] Foreign Application Priority Data "April 10, 1990 (DE) Fed. Rep. of Germany 4011498"

Signed and Sealed this

Twelfth Day of October, 1993

Attest:

BRUCE LEHMAN

*Attesting Officer*              *Commissioner of Patents and Trademarks*